Dec. 11, 1962  J. VLASIC  3,067,807
TIRE TOOL
Filed July 19, 1960
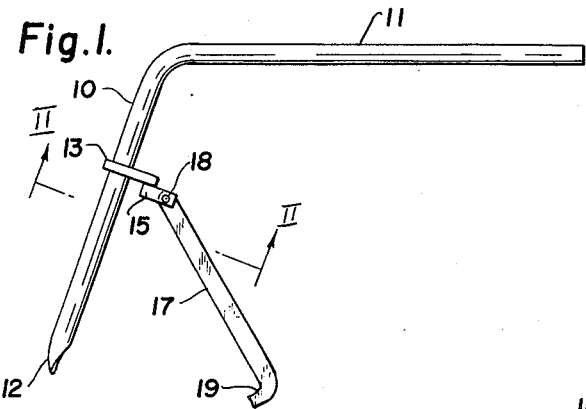
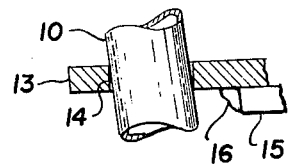
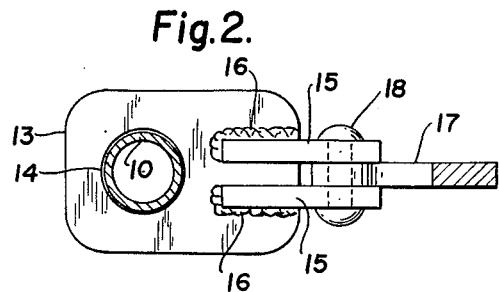
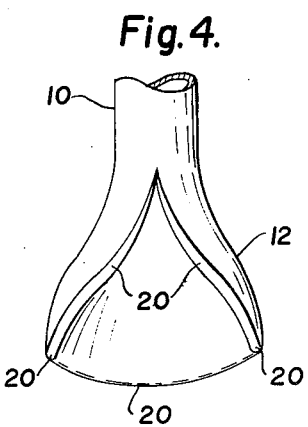
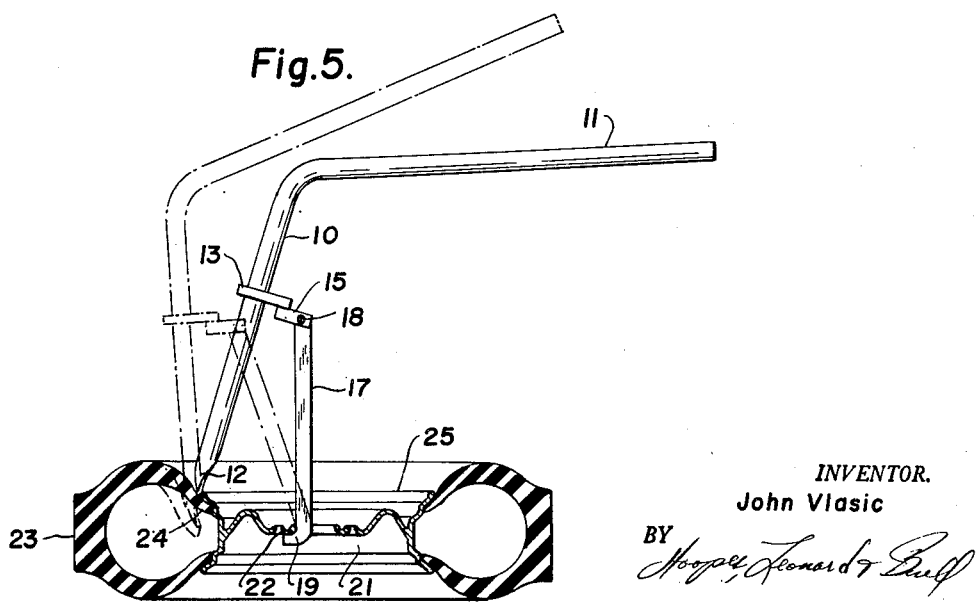
INVENTOR.
John Vlasic
BY
his ATTORNEYS

United States Patent Office 3,067,807
Patented Dec. 11, 1962

3,067,807
TIRE TOOL
John Vlasic, 556 Edgeview St., New Kensington, Pa.
Filed July 19, 1960, Ser. No. 43,861
1 Claim. (Cl. 157—1.26)

This invention relates broadly to tire tools and more particularly to a tire tool that is useful in loosening a tire from the wheel it is mounted on.

It is well known that a tire has a bead portion which engages the rims of the wheel it is mounted on. In present day tires and particularly in tubeless tires this bead portion of the tire becomes very securely engaged with the rim of the wheel and very often is quite difficult to break away or loosen from the rim when changing tires. Without a tire tool it is generally necessary to completely deflate, or nearly so, the tire prior to breaking the bead portion loose from the wheel rim, and even then it is accomplished only with considerable difficulty.

A number of tools have been devised for breaking the tire bead loose from the wheel rim whereby it is not necessary to completely deflate the tire prior thereto. However, these devices only fit certain size or style tires and wheels or they tend to cut or damage the tire side walls or the tube disposed within the tire, if it be a tube type tire. The size limitation is particularly important when it is recognized that there are so many different size tires and wheels in use on present day vehicles; from the relatively small tires of small automobiles to large truck tires.

My tire tool is adjustable to suit nearly any size tire and wheel presently in use. It may be adjusted for use on the relatively small tires of compact cars for instance, as well as on the large tires of semi-trailer trucks and may be infinitely adjusted therebetween. Other tire tools for this purpose are either limited to one particular size or have only a few fixed adjustments from which to choose.

Prior devices show impact means whereby the tire is loosened from the wheel by hammering down on the sidewall of the tire or otherwise directing force against the sidewall of a tire to push and break the bead of the tire away from the rim of the wheel. This often results in replacing the tire walls or otherwise weakening them and is undesirable from that standpoint as well as from the standpoint of the physical effort required. In my invention the tool is forced between the tire at its bead portion and the rim to spread them apart and thus break the tire loose. This not only protects the tire from the aforementioned damage but requires far less physical effort on the part of the operator and further, in the case of tubeless tires, does not require the operator to deflate automobile tires prior to breaking them loose.

I provide a tire tool for use in loosening a tire from a wheel comprising an elongated lever member having an extended handle portion at one end and a tire bead engaging head portion at the other end, a moveable dog element slidably mounted upon said lever member and selectively engageable therewith, said dog element having an offset portion integral therewith and guy means swingably attached to said offset portion and having a hook portion adapted for engaging said wheel.

Other details, objects and advantages of the invention will become apparent as the following description of a certain present preferred embodiment thereof proceeds.

In the accompanying drawing, I have illustrated a present preferred embodiment of the invention in which:

FIGURE 1 is a side elevational view of a present preferred embodiment of my invention;

FIGURE 2 is an enlarged view taken on the line II—II of FIGURE 1;

FIGURE 3 is an enlarged partial cross-sectional view showing the engaging or locking of the adjustable dog plate with the lever table;

FIGURE 4 is an enlarged fragmentary elevational view of the tire bead engaging head portion of the lever member; and FIGURE 5 is an elevational view of a present preferred embodiment of my invention as applied to a tire mounted on a wheel.

Referring to the drawing, and initially to FIGURE 1, I have illustrated a tire tool comprising an elongated tubular lever arm 10 having an extended handle portion 11 and a tire bead engaging head 12. A dog plate 13 having a hole 14 is carried on lever arm 10. Lever arm 10 passes through hole 14 with a small clearance whereby dog plate 13 may be slid up or down lever arm 10. Dog plate 13 also has an offset portion 15 comprising two spaced plates in a clevis arrangement, as shown in FIGURE 2, integrally attached to dog plate 13 as by welds 16. A guy bar 17 is pivotally attached to offset portion 15 by rivet 18. Guy bar 17 is hook-shaped at the end thereof as shown at reference 19. It should be noted that guy bar 17 fits closely between said spaced plates of said offset portion 15, as shown in FIGURE 2, and that the adjoining surfaces of said plates and guy bar are flat so that guy bar 17 swings solely in a single plane with respect to the dog plate 13 thus minimizing side sway.

Referring to FIGURE 4, it is clear that head 12 is formed by splitting and flaring out the end of tubular lever arm 10. The edges 20 of head 12 are then rounded off and smoothed to insure against cutting or slashing the tire casing when manipulating the tire tool.

Referring now to FIGURE 5, I shall describe how my tool is used in breaking a tire loose from a wheel. Initially, the operator slides dog plate 13 along lever arm 10 to the position best suited for the size of the tire and wheel involved. Hook 19 of guy bar 17 is then engaged with wheel 21 adjacent its center hole 22 and head 12 is brought to bear on tire 23 near its bead portion 24 adjacent rim 25 of wheel 21 as shown in solid line in FIGURE 5. When head 12 is brought to bear on tire 23 as aforementioned, guy bar 17 which is hooked to wheel 21 pulls on offset portion 15 and thereby locks dog plate 13 in engagement with lever arm 10 due to the binding of lever arm 10 in hole 14, as detailed in FIGURE 3. Thereafter, the application of additional pressure to handle 11 causes the tire tool to pivot about the point of engagement of hook 19 and wheel 21 with the result that head 12 of lever 10 is forced down in between rim 25 and tire bead portion 24 to thereby break tire 23 away from wheel 21, as shown in chain line in FIGURE 5.

As is clear from the drawing, dog plate 13 may be adjusted and positioned at an innumerable number of points along lever arm 10 to accommodate any of the many different sizes of tires in general use today. The flaring of head 12 provides a wedge which will slip between the rim and tire rather than dig into the tire wall or simply push and break down the tire wall which could injure the tire. This flaring also provides a sufficiently wide base to prevent sidewise wobbling or slipping of head 12 which might otherwise occur if the operator happens to lift on handle 11 at other than substantially right angles to the wheel, yet nevertheless is not so wide as to disperse the force of head 12 over too large an area and thereby unnecessarily increase the amount of operator effort needed to loosen the tire.

With my invention it is possible for the operator to break loose a tubeless tire from a wheel without prior deflating of the tire except perhaps in the case of larger truck tires which even then need not be completely deflated. Of course, it is understandable that a partial deflation of any tire would make it easier to break loose so far as the physical effort required on the part of the operator.

Guy bar 17 may be other than that the substantially rigid member illustrated in the drawing. It may be a flexible member such as a cable or chain and still be suitable as a guy member. However, I prefer a substantially rigid guy bar 17 because it is easier to hook on to a wheel than a flexible member which would require the operator to reach down to hook it on.

While I have shown and described a present preferred embodiment of the invention, it is to be distinctly understood that the invention is not limited thereto but may be otherwise variously embodied within the scope of the following claim.

I claim:

A tire tool for use in loosening a tire from a wheel having a central opening therein comprising an elongated lever member having a flared head portion at one end thereof adapted to engage the tire bead portion of a tire and an angularly extended handle portion at the other end thereof, a movable dog element slidably mounted upon said lever member and selectively engageable therewith and a rigid guy bar hooked at one end thereof for engagement with a tire wheel adjacent the central opening thereof, said dog element having a pair of spaced plates integral therewith and offset therefrom and extending therefrom in the direction of said handle portion, said guy bar having its other end disposed between said plates in a close relationship therewith and being pivotally attached thereto, said plates and guy bar having flattened adjoining surfaces whereby said guy bar is swingable in a single plane only with respect thereto.

References Cited in the file of this patent
UNITED STATES PATENTS

| | | |
|---|---|---|
| 615,273 | Higdon | Dec. 6, 1898 |
| 2,305,886 | Mahler | Dec. 22, 1942 |
| 2,391,626 | Howard | Dec. 25, 1945 |
| 2,500,319 | Neely | Mar. 14, 1950 |
| 2,501,225 | Kuhlmann | Mar. 21, 1950 |